United States Patent
Verny et al.

(10) Patent No.: US 7,156,462 B2
(45) Date of Patent: Jan. 2, 2007

(54) SEAT CONVERTIBLE INTO A BED, IN PARTICULAR FOR AIRCRAFT

(75) Inventors: Christian Verny, Champagne (FR); Laurent Cecinas, Rochefort (FR); Gabriel Martin, Echillais (FR)

(73) Assignee: Eads Sogerma Services, Merignac (FR)

( * ) Notice: Subject to any disclaimer, the term of this patent is extended or adjusted under 35 U.S.C. 154(b) by 148 days.

(21) Appl. No.: 10/450,437

(22) PCT Filed: Dec. 21, 2001

(86) PCT No.: PCT/FR01/04153

§ 371 (c)(1),
(2), (4) Date: Dec. 1, 2003

(87) PCT Pub. No.: WO02/051703

PCT Pub. Date: Jul. 4, 2002

(65) Prior Publication Data

US 2004/0080201 A1      Apr. 29, 2004

(30) Foreign Application Priority Data

Dec. 26, 2000   (FR)   .................................. 00 17034

(51) Int. Cl.
    *B60N 2/00* (2006.01)
(52) U.S. Cl. ........................... 297/354.13; 297/354.12; 297/423.3
(58) Field of Classification Search ........... 297/354.13, 297/118, 123, 321, 423.3, 345.13; 244/118.6, 244/122 R, 118.1

See application file for complete search history.

(56) References Cited

U.S. PATENT DOCUMENTS

| | | | | |
|---|---|---|---|---|
| 5,333,818 A | * | 8/1994 | Brandt et al. | 244/118.6 |
| 5,425,516 A | * | 6/1995 | Daines | 244/118.6 |
| 5,454,624 A | * | 10/1995 | Anglade et al. | 297/354.13 |
| 5,740,989 A | * | 4/1998 | Daines | 244/118.6 |
| 5,788,183 A | * | 8/1998 | Marechal | 244/118.6 |
| 5,992,798 A | * | 11/1999 | Ferry | 244/118.6 |
| 6,056,239 A | * | 5/2000 | Cantu et al. | 244/118.6 |
| 6,170,786 B1 | * | 1/2001 | Park et al. | 248/274.1 |
| 6,227,489 B1 | * | 5/2001 | Kitamoto et al. | 244/118.5 |

FOREIGN PATENT DOCUMENTS

| | | |
|---|---|---|
| EP | 0 869 060 | 10/1998 |
| EP | 0 869 061 | 10/1998 |
| EP | 0 957 025 | 11/1999 |
| EP | 1 043 225 | 10/2000 |
| GB | 2 295 962 | 6/1996 |

* cited by examiner

*Primary Examiner*—Peter M. Cuomo
*Assistant Examiner*—Erika Garrett
(74) *Attorney, Agent, or Firm*—Oblon, Spivak, McClelland, Maier & Neustadt, P.C.

(57) ABSTRACT

A convertible seat, e.g., for an aircraft, including a fixed structure and a mobile structure, including a seat bottom, a seat back, a leg rest and, optionally, a leg rest extension. The different elements of the mobile structure are mechanically connected to each other, and to the fixed structure, to automatically move the mobile structure between a first extreme seat type posture and a second extreme bed type posture, passing through given ergonomically comfortable intermediate postures, using a single control. This control may be a manual control or a motorized control.

12 Claims, 4 Drawing Sheets

SEAT CONVERTIBLE INTO A BED, IN PARTICULAR FOR AIRCRAFT

TECHNICAL FIELD

This invention relates to a seat that can be converted to a bed, designed for use on a vehicle such as an aircraft.

More precisely, the invention relates to a seat that can be converted to a bed, provided with a single control that can be used to bring it into an ergonomically comfortable position over its entire adjustment range.

A seat conform with the invention has a preferred application on aircraft, and particularly on aircraft intended for passenger transport and on business aircraft. However, it can also be used on other types of vehicles such as trains and buses.

STATE OF THE ART

The most comfortable seats used on aircraft comprise a fixed structure that supports a tilting or mobile structure designed so that it can be in two extreme postures, and a large number of more or less ergonomic intermediate postures.

In a first of these extreme postures, the tilting structure of the seat is in the form of a seat for which the seat back is lifted, in other words approximately vertical. This posture is used during takeoff and landing of the aircraft.

In the second extreme posture, the tilting structure is in the form of a bunk or a bed. This posture enables the passenger to rest whenever he wishes.

Existing seats that can occupy these two extreme positions typically include a seat bottom, a seat back articulated on the rear part of the seat bottom and an articulated leg rest on the front part of the seat bottom.

Some existing seats are designed such that the inclination of the seat bottom is related to the inclination of the seat back over the entire adjustment range of the seat. Document GB-A-2 295 962 describes a seat of this type, in which the front end of the seat bottom is supported on a carriage that rolls on the floor forwards when the seat bottom and the seat back move towards their "bed" posture or backwards when they move towards their "seat" posture. A separate control moves the leg rest from its retracted position to its extended position, and vice versa.

The disadvantage of this type of seat is that the passenger must make two different settings whenever he wishes to modify the posture of the seat. It is therefore difficult to obtain the ergonomically most comfortable posture.

Furthermore, the existence of two independent settings complicates the control box, regardless of whether it is manual or electric.

Furthermore, the arrangement described in document GB-A-2 295 962 is such that the carriage linked to the front end of the seat bottom can tilt upwards if an air pocket is encountered, and thus cause accelerated wear of the floor.

There are also some aircraft seats in which the leg rest includes an extension, the deployment of which is related to the inclination of the leg rest over the entire inclination range of the leg rest.

This type of seat has disadvantages similar to the previous disadvantages, concerning the complexity of the control box and the difficulty for the passenger of finding an ergonomically comfortable position.

Other existing seats are designed such that movements of the seat back, the seat bottom and the leg rest are related. However, this connection can only be used to bring the seat into one of its extreme postures, in other words either to bring the seat into its "seat" posture used during takeoff and landing, or to put the seat into its "bed" posture. In other words, a single control is not sufficient to reach all intermediate postures with this type of seat.

Documents EP-A-0 869 061 and EP-A-1 043 225 describe an aircraft seat in which a first electric motor controls movement of the seat back and a second electric motor controls relative movement between the leg rest and the seat bottom, the leg rest being supported on the floor. A microprocessor controls the second electric motor in response to signals output from a potentiometer connected to the first electric motor, such that the angle between the leg rest and the seat bottom depends on the position occupied by the seat back. Consequently, the position of the seat bottom is determined simultaneously by the two settings.

This type of seat is still relatively complex, because it uses two separate electric motors. Furthermore, the low end of the leg rest is permanently supported on the floor, such that the seat is strongly inclined when in its "bed" posture. This arrangement is also not very satisfactory because the seat bottom-leg rest assembly can tilt upwards when air pockets are encountered, and also because of the resulting wear on the floor at the position at which it comes into contact with the leg rest.

PRESENTATION OF THE INVENTION

The purpose of the invention is a seat with an innovative design by which it is automatically brought into an ergonomically comfortable position over its entire adjustment range using a single control, and without any mobile part being supported on the floor.

According to the invention, this result is achieved using a seat that can be converted into a bed for a vehicle such as an aircraft, the said seat comprising a fixed structure and a mobile structure, including a seat bottom, a seat back articulated on the seat bottom and a leg rest also articulated on the seat bottom, first guide means being inserted between the fixed structure and the seat back to enable controlled displacement of the seat back between a first approximately vertical extreme position and a second approximately horizontal extreme position, characterised in that the second guide means are inserted between the fixed structure, the seat bottom and the leg rest, such that the controlled displacement of the seat back between its first position and its second position is accompanied by corresponding displacements of the seat bottom and the leg rest and its effect is to automatically move the mobile structure between a first extreme seat type posture and a second extreme bed type posture, passing through given intermediate postures.

As a result of this arrangement, the inclinations of the seat bottom, the seat back and the leg rest are mechanically linked together. Therefore, by using a single manual or motorised control, the mobile structure can be moved between its two end postures through ergonomically comfortable positions over the entire adjustment range of the seat.

In one preferred embodiment of the invention, the second guide means comprise at least one first connecting rod for which the ends are articulated onto the fixed structure and onto the seat bottom, such that the seat can occupy ergonomic intermediate positions.

Preferably, the second guide means also comprise a first control mechanism connecting the leg rest to the fixed structure and to the first connecting rod.

Advantageously, the, first control mechanism then comprises at least one second connecting rod, one end of which is articulated to a third connecting rod articulated at its other end to the fixed structure, and the other end of which is articulated to a fourth connecting rod articulated at its other end to the leg rest, this second connecting rod being articulated to the first connecting rod between the ends of the first and second connecting rods.

Preferably, the mobile structure also comprises an extension of the leg rest, capable of sliding on the leg rest between a retracted extreme position and an extended extreme position, and a second control mechanism connecting the said extension to the seat bottom and to the leg rest, such that a deformation of the mobile structure between its first extreme posture and its second extreme posture is accompanied by a progressive displacement of the extension between its retracted extreme position and its extended extreme position.

In this case, the second control mechanism advantageously comprises at least one fifth connecting rod, one end of which is articulated to a sixth connecting rod the other end of which is articulated to the seat bottom, and the other end of which is articulated to a seventh connecting rod the other end of which is articulated to the extension of the leg rest, the fifth connecting rod also being articulated to the leg rest at an intermediate point on the fifth connecting rod.

As a variant, the second control mechanism comprises at least one cable wound around pulleys supported by the seat bottom, the leg rest and the leg rest extension.

In the preferred embodiment of the invention, the first guide means comprise first guide devices installed on a top part of the seat back, first slides connected to the fixed structure with which the first guide devices cooperate, second guide devices installed on a bottom part of the seat back and second slides connected to the fixed structure and with which the second guide devices cooperate.

In this case, the first slides are preferably approximately vertical and the second slides are approximately horizontal.

Advantageously, the second guide devices are centred on a hinge pin between the seat back and the seat bottom.

BRIEF DESCRIPTION OF THE DRAWINGS

We will now describe a preferred embodiment of the invention as an illustrative example that is in no way limitative, with reference to the attached drawings in which.

DETAILED DESCRIPTION OF A PREFERRED EMBODIMENT OF THE INVENTION

A preferred embodiment of the seat according to the invention is described with reference firstly to the very diagrammatic views shown in FIGS. 1 and 2, and secondly to the detailed views illustrated in FIGS. 3 to 5.

Throughout this description, the terms "front" and "back" refer to the front and back of the seat itself, respectively.

Figure 3:
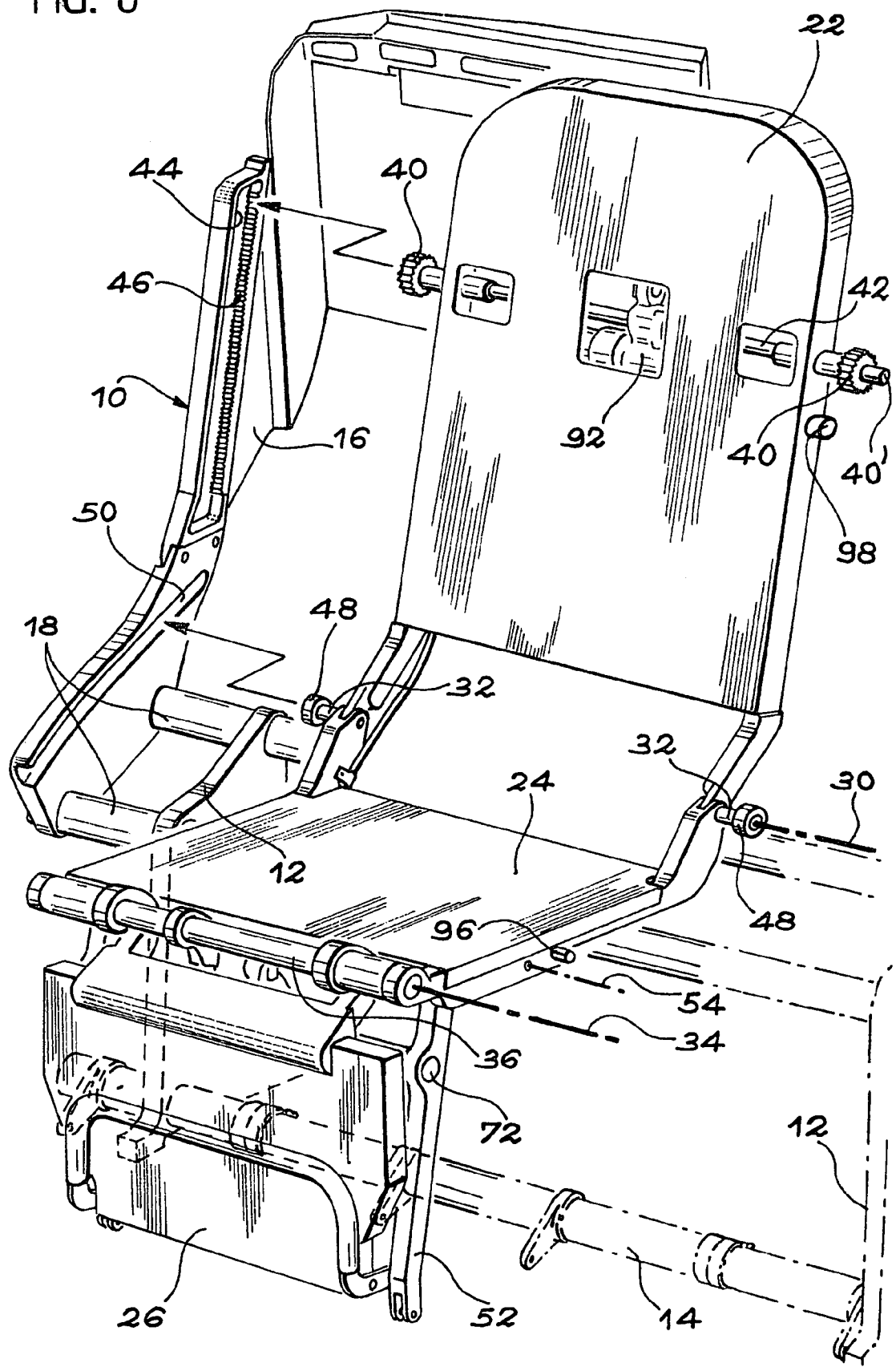
FIG. 3 is an exploded perspective front view representing a preferred embodiment of the seat according to the invention.

The seat comprises a fixed structure 10, only part of which is illustrated in FIG. 3. The fixed structure 10 is designed so that it can be installed on the floor (not shown) of a vehicle such as an aircraft, by attachment means well known to those skilled in the art and that will not be described here, for simplification reasons.

The fixed structure 10 can be assigned to a single seat, or alternatively can belong to two seats placed side by side. It comprises two stands 12, through which the structure is supported on the floor, and an anchor bar 14 connecting the stands 12 to each other, at their front ends, close to the floor. The fixed structure 10 also comprises two side plates 16 forming elbows and two cross bars 18 through which the plates 16 are connected to the stands 12. The anchor bar 14 and the cross bars 18 are oriented along a direction transverse to the seat.

The seat according to the invention also comprises a mobile or tilting structure 20, fully supported by the fixed structure 10 and installed on it so as to be able to move between a first extreme posture in the form of a seat and a second extreme posture in the form of a bed or a bunk, passing through an infinite number of given intermediate postures chosen such that they are all ergonomically comfortable for the passenger.

The mobile structure 20 comprises a seat bottom 24, a seat back 22, a leg rest 26 and a leg rest extension 28.

The lower edge of the seat back 22 is articulated to the back edge of the seat bottom 24 through a first hinge pin 30, materialised by two journals 32 in line with each other. The top edge of the leg rest 26 is articulated on the front edge of the seat bottom 24 by a second hinge pin 34, materialised by a journal 36. The hinge pins 30 and 34 are oriented along a direction transverse to the seat.

The leg rest extension 28 is supported by the leg rest 26 so that it can slide in the plane of the leg rest, perpendicular to the hinge pin 34, by moving away from and towards the hinge pin, between a retracted extreme position and an extended extreme position. Consequently, slides 38 (FIGS. 1 and 2) are inserted between the extension 28 and the leg rest 26.

Guide means are provided firstly between the seat bottom 24 of the seat and the fixed structure 10. These guide means comprise two guide devices in this case consisting of rollers 48. Each of the rollers 48 may be placed on one of the journals 32 materialising the hinge pin 30 of the seat 24 on the seat back 22, but this is not the only possibility. Each of the rollers 48 fits into a slide 50 formed on the inside face of the side plate 16 located on the same side of the seat. The slides 50 are in approximately straight lines and are horizontal.

Figure 4:
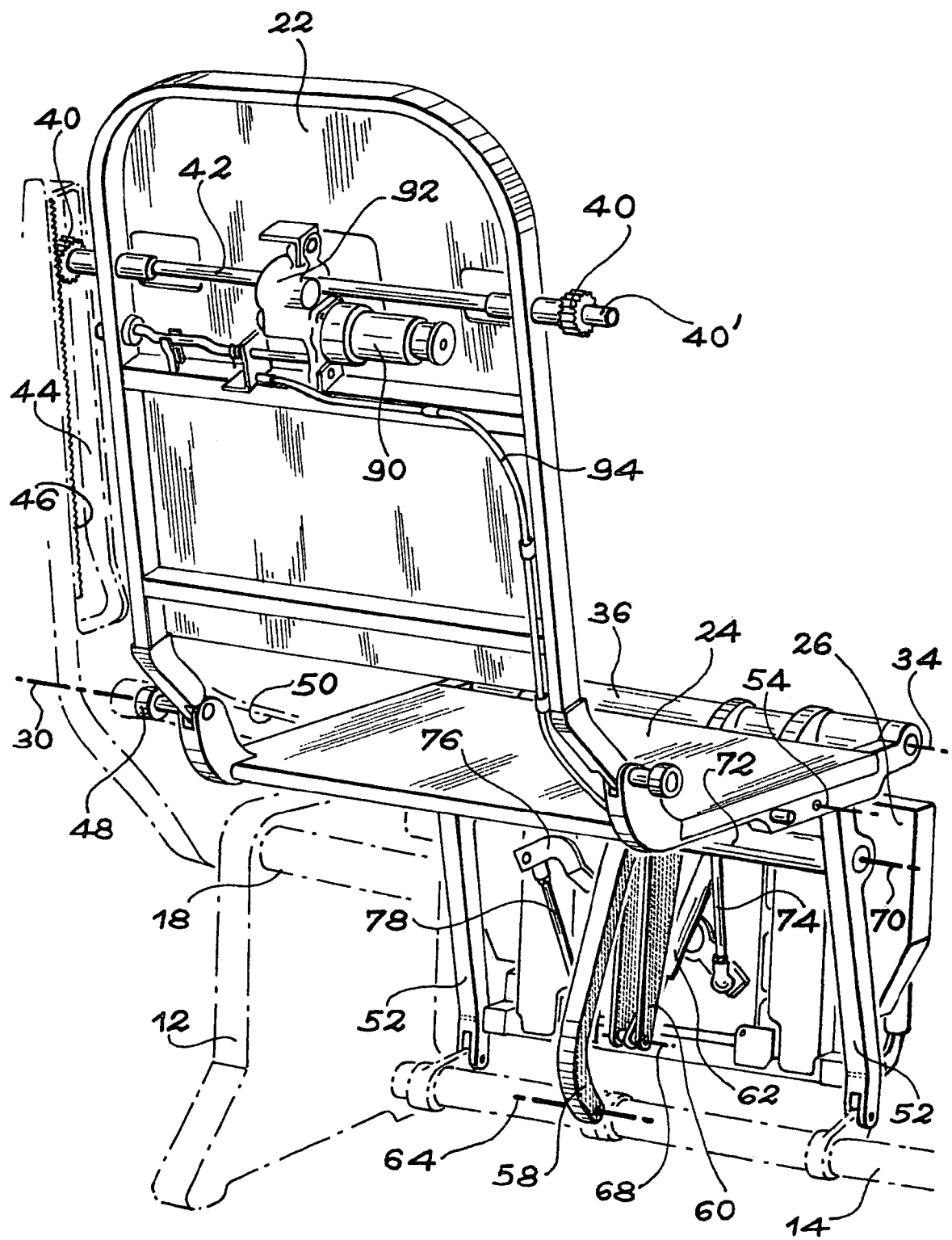
FIG. 4 is a rear perspective view of the seat according to FIG. 3.
Figure 5:
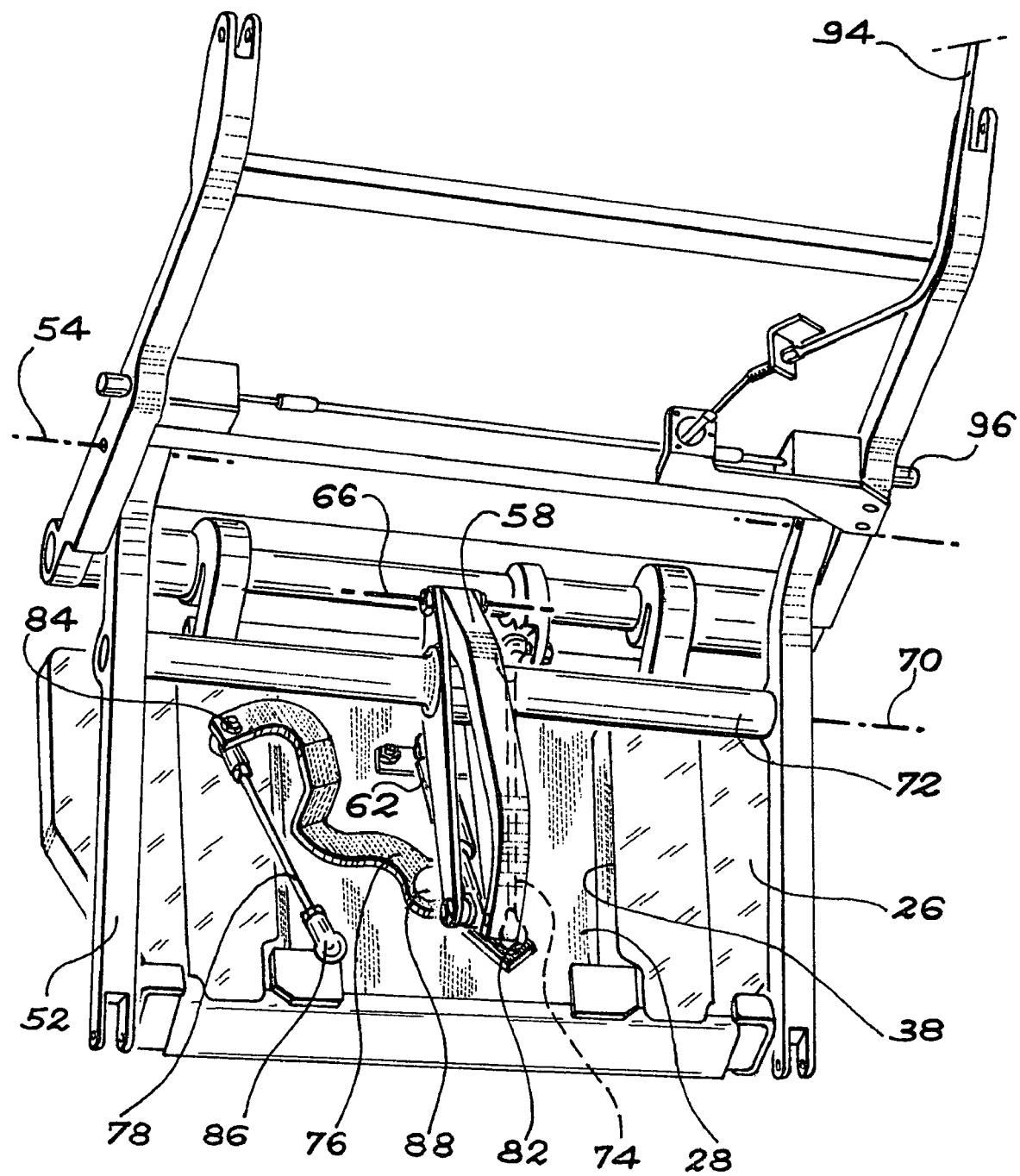
FIG. 5 is a perspective view from underneath of the seat according to FIG. 3.

The above-mentioned guide means also include at least one first connecting rod 52 (two connecting rods 52 are used in the embodiment illustrated in FIGS. 3 to 5), in order to enable perfectly controlled displacement of the seat bottom 24. The top end of each connecting rod 52 is articulated under a front part of the seat bottom 24 by a hinge pin 54, and the bottom end of each connecting rod 52 is articulated onto the fixed structure 10 by a hinge pin 56. The position of the hinge pin 54 is such that the position of the seat bottom is approximately horizontal at both ends of its travel, passing through ergonomic intermediate positions. The hinge pins 54 and 56 are oriented along a direction transverse to the seat.

More precisely, the hinge pin 56 connects the connecting rod 52 to a clevis fixed to the anchor bar 14. The connecting rods 52 are approximately vertical when the mobile structure 12 is in its first extreme posture, in the form of a seat, as illustrated in FIGS. 1, 3 and 4.

Other guide means are provided between the fixed structure 10, the back 22 and the leg rest 26, such that displacement of the seat bottom 24 between its two extreme positions results in corresponding controlled displacements of the seat back 22 and the leg rest 26. These displacements are such that the mobile structure then automatically moves between its two extreme postures, in the form of a seat and a bed respectively.

Guide means are also provided between the seat back 22 of the seat and the fixed structure 10. These guide means enable controlled displacement of the seat back 22 between a first approximately vertical extreme position and a second approximately horizontal extreme position.

In the embodiment shown in FIGS. 3 and 4, these guide means comprise two guide devices in this case composed of rollers 40', fixed to the ends of a drive shaft 42 supported free to rotate about a top part of the seat back 22. The drive shaft 42 is oriented along a direction transverse to the seat. Each of the rollers 40' fits into a slide 44 formed on the inside face of the side plate 16 located on the same side of the seat. The slides 44 are approximately straight and vertical. Each slide is provided with a rack 46 on which there is a gear wheel 40 fixed to a corresponding roller 40'. As will be described later, this arrangement is also a means of controlling the displacement of the inclining structure 20 between its extreme positions.

The guide means also comprise a control mechanism that connects a bottom part of the leg rest 26 to the fixed structure 10 and to the connecting rods 52, so that the leg rest 26 is automatically displaced in a controlled manner when the front part of the seat back 24 moves.

In the embodiment shown in the Figures, the above mentioned control mechanism comprises three connecting rods 58, 60 and 62 articulated end to end.

A bottom end of the connecting rod 58 is articulated onto the fixed structure 10 through a hinge pin 64. More precisely, the hinge pin 64 passes through a clevis fixed to the anchor bar 14. The top end of the connecting rod 58 is articulated onto a top end of the connecting rod 60 through a hinge pin 66, visible in FIG. 5. Another hinge pin 68 connects the bottom end of the connecting rod 60 to the bottom end of the connecting rod 62. The top end of the connecting rod 62 is articulated in turn, under the leg rest 26 through another hinge pin 69. Finally, a hinge pin 70 materialised by a journal 72 connects the connecting rods 52 and 60 to each other, at their ends. The hinge pins 64, 66, 68, 69 and 70 are oriented along a direction transverse to the seat.

With the layout described above, a forwards displacement of the front part of the seat bottom 24 that gradually lowers and inclines the seat back 22, has the effect of gradually raising the leg rest 26, or vice versa.

In the embodiment shown, the extension 28 of the leg rest 26 is also linked to the seat bottom 24 and to the leg rest 26 through a control mechanism that gradually displaces the extension 28 between its retracted extreme position and its extended extreme position, when the mobile structure 20 is deformed between its first extreme posture forming a seat and its second extreme posture forming a bed. However, note that the presence of the leg rest extension 28 and the second control mechanism is optional. In other words, the invention is also applicable to a seat without a leg rest extension.

Figures 1, 2:
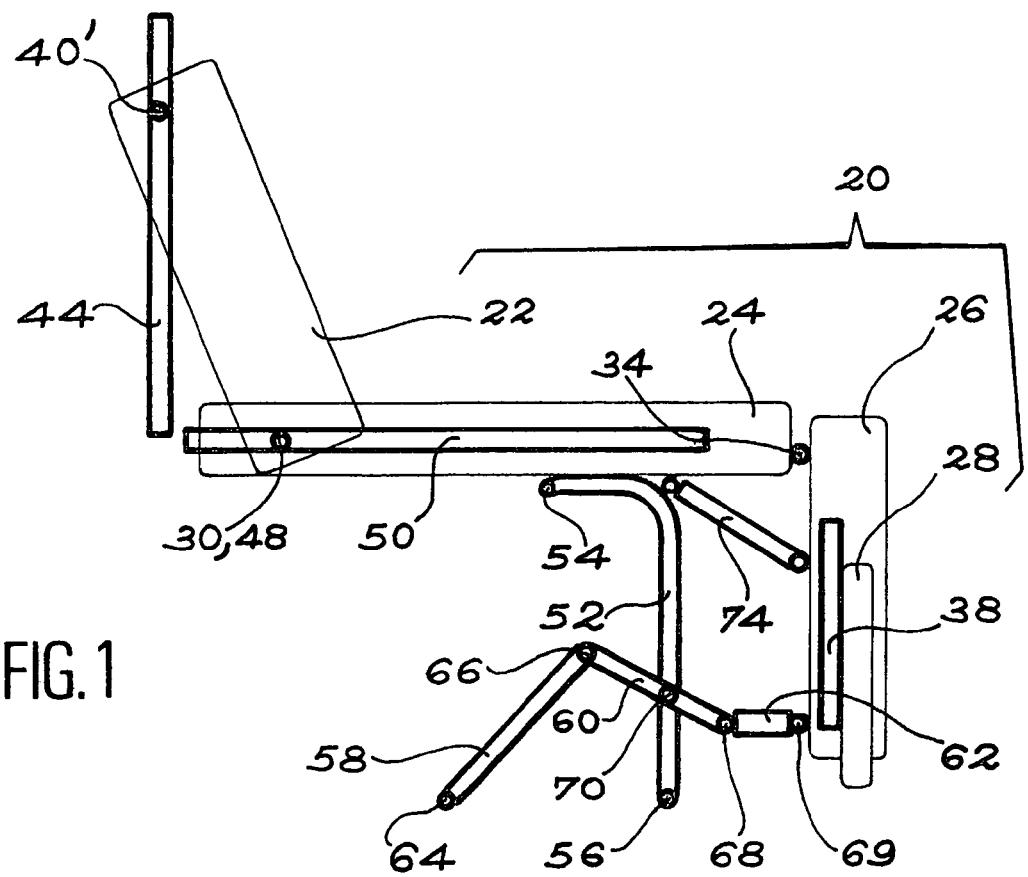
FIG. 1 is a side view that very diagrammatically shows the mobile structure of a seat according to the invention.
FIG. 2 is another very diagrammatic view from underneath, in particular illustrating the control mechanism of an extension of the leg rest.

In the embodiment illustrated in FIGS. 2, 4 and 5, this control mechanism comprises three connecting rods 74, 76 and 78 articulated end to end.

A top end of the connecting rod 74 is articulated under the seat bottom 24 of the mobile structure, through a ball joint 80. The bottom end of the connecting rod 74 is in turn articulated to a first end of the connecting rod 76 through a hinge pin 82. The second end of the connecting rod 76 is articulated to the top end of the connecting rod 78 through a hinge pin 84. The bottom end of the connecting rod is articulated in turn under the extension 28 of the leg rest 26 through a hinge pin 86. Finally, the central part of the connecting rod itself is articulated between its ends under the leg rest 26 through a hinge pin 28. The hinge pins 82, 84, 86 and 88 are all parallel to each other and are perpendicular to the plane of the leg rest 26 and its extension 28.

According to the arrangement that has just been described, gradual raising of the leg rest 26 is initiated by combined displacement of the seat back 22 and the seat bottom 24 forwards and downwards, resulting in a gradual movement of the extension 28 from its extreme retracted position to its extreme extended position.

In one variant embodiment not shown, connecting rods 74, 76 and 78 are replaced by an endless cable. This cable is wound on free running pulleys supported by the seat bottom 24, the leg rest 26 and its extension 28, in turn. This mechanism produces an effect similar to the effect obtained by the embodiment described.

In summary, a seat conform with the invention is designed such that all elements that form part of the mobile structure 20, namely the seat bottom 24, the seat back 22, the leg rest 26, and optionally the extension 28 of the leg rest, are mechanically connected to each other and to the fixed structure 10. Consequently, a single control displacing any one of these elements between two end positions will move the seat between a first posture forming a seat and a second posture forming a bed, passing through an infinite number of given intermediate postures, each of which corresponds to an ergonomically comfortable position for the passenger.

The single control may be a manual control and/or a motorised control. The embodiment illustrated in FIGS. 3 and 4 represents an advantageous arrangement in this case.

More precisely, FIG. 4 shows that the shaft 42 on which the gears 40 are installed is designed to be rotated in either direction by an electric motor 90, through a reduction gear mechanism 92. The motor 90 and the reduction gear mechanism 92 are installed behind the back 22. A control box (not shown) is installed on the seat, at a location easily accessible to the passenger such as on one of the side plates 16 forming elbow rests. This control box is connected to the motor 90 through an electric cable 94. FIGS. 3 to 5 show a manual lock 96 and a control button 98 for the lock, as a non-limitative example.

The electric motor 90 or the manual control can also act on the fixed structure 10 and any one of the mobile elements 22 or 24, or connecting rods 52 and 58, or between the connecting rods 58 and 60, or 60 and 62. If the electric motor 90 exists, it can entrain any rack and pinion, or screw and nut device, etc.

The invention claimed is:

1. Seat that can be converted to a bed, the seat comprising:
   a fixed structure and a mobile structure comprising a seat bottom, a seat back articulated on the seat bottom, and a leg rest also articulated on the seat bottom;
   first guide means inserted between the fixed structure and the seat back, for enabling controlled displacement of the seat back between a first approximately vertical extreme position and a second approximately horizontal extreme position; and second guide means for the causing the controlled displacement of the seat back to be accompanied by displacement of the seat bottom and leg rest for automatically moving the mobile structure between a first extreme seat posture and a second extreme bed posture, passing through given intermediate postures, wherein said second guide means connects the leg rest to the fixed structure and the seat bottom.

2. Seat according to claim 1, wherein the second guide means comprises at least a first connecting rod in which ends are articulated onto the fixed structure and onto the seat bottom, such that the seat bottom can occupy ergonomic intermediate positions.

3. Seat according to claim 2, wherein the second guide means further comprises a first control mechanism connecting the leg rest to the fixed structure and to the first connecting rod.

4. Seat according to claim 3, wherein the first control mechanism comprises at least one second connecting rod, ends of which are articulated to a third connecting rod articulated at its other end to the fixed structure, and the other end of which is articulated to a fourth connecting rod articulated at its other end to the leg rest, the second connecting rod being articulated to the first connecting rod between the ends of the first and second connecting rods.

5. Seat according to claim 1, wherein the mobile structure further comprises an extension of the leg rest, configured to slide on the leg rest between a retracted extreme position and an extended extreme position, and a second control mechanism connecting the extension to the seat bottom and to the leg rest, such that a deformation of the mobile structure between its first extreme posture and its second extreme posture is accompanied by a progressive displacement of the extension between its retracted extreme position and its extended extreme position.

6. Seat according to claim 5, wherein the second control mechanism comprises at least one fifth connecting rod, one end of the fifth connecting rod is articulated to a sixth connecting rod the other end of which is articulated to the seat bottom, the other end of the fifth connecting rod is articulated to a seventh connecting rod the other end of which is articulated to the extension of the leg rest, the fifth connecting rod being articulated to the leg rest at an intermediate point on the fifth connecting rod.

7. Seat according to claim 5, wherein the second control mechanism comprises at least one cable wound around pulleys supported by the seat bottom, the leg rest, and the leg rest extension.

8. Seat according to claim 1, wherein the first guide means comprises first guide devices installed on a top part of the seat back, first slides connected to the fixed structure with which the first guide devices cooperate, second guide devices installed on a bottom part of the seat back, and second slides connected to the fixed support and with which the second guide devices cooperate.

9. Seat according to claim 8, wherein the first slides are approximately vertical and the second slides are approximately horizontal.

10. Seat according to claim 8, wherein the second guide devices are centered on a hinge pin between the seat bottom and the seat back.

11. Seat according to claim 1, wherein a single manual control moves the mobile structure between the first extreme posture and the second extreme posture.

12. Seat according to claim 1, wherein a single motorized control moves the mobile structure between the first extreme posture and the second extreme posture.

* * * * *